3,694,152
PROCESS FOR PRODUCING SYNTHETIC ZEOLITE
Riccardo Sersale, Enrico Franco, Rosario Ajello, and Carmine Colella, Naples, Italy, assignors to Snam Progetti, S.p.A., Milan, Italy
No Drawing. Filed Oct. 13, 1969, Ser. No. 866,014
Claims priority, application Italy, Oct. 18, 1968, 22,654/68, Patent 845,354
Int. Cl. C01b 33/28
U.S. Cl. 423—329                              1 Claim

ABSTRACT OF THE DISCLOSURE

Synthetic crystalline zeolites are prepared by treating natural glasses, such as Lipari pumice, and synthetic glasses prepared by melting a suitable mixture of oxides or silicoaluminates with an alkaline solution at a temperature within the range of 50° C. to 150° C. until the crystalline zeolite forms. Faujasite is prepared by treating each of pulverized pumice and a synthetic glass having the composition $3Na_2O.Al_2O_3.4SiO_2$ with a sodium hydroxide solution at an elevated temperature.

---

The present invention relates to the preparation of the crystalline silico-aluminates of the molecular sieve type, by employing a method different from those previously known. It is known that the zeolites as regards to the structure comprise essentially a tridimensional open structure consisting of the connection of the tetrahedrical structures of $SiO_2$ and $AlO_2$. Said tetrahedrons are linked transversally by shared oxygen atoms, so that the ratio between the oxygen atoms and the silicon plus aluminum atoms is two.

The negative electrovalence of the tetrahedron containing the aluminum is satisfied by including in the crystal cations which are generally alkaline or alkaline-earth metal ions.

The various families of zeolites differ also in the vicariance degree of the aluminum as to the silicon.

A general formula may be represented in the following way:

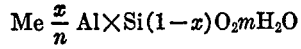

wherein $x$ = vicariance degree which is always higher than 0
$n$ = ionic charge of the metal cation
$m$ = variable coefficient, according to the hydration degree.

The internal cavities are occupied, as aforesaid, by cations or water molecules which may undergo an ionic exchange or a dehydration in a reversible way, therefore allowing foreign molecules to enter said crystalline structures. This phenomenon may be utilized either to perform a physical separation of molecules of different size, and in this case the zeolites behave as molecular sieves. or the chemical and chemico-physical characteristics of these cavities surfaces may be employed to obtain very interesting products for the catalysis, mainly in the oil industry field. The huge development of this industry, continuously increasing, has affected also the production of the zeolites.

Heretofore several processes for the synthetic zeolites production have been reported.

They are founded essentially on two methods:

(1) The crystallization of silica and alumina gel in suitable and defined conditions of concentration, temperature, and mother solution pH.
(2) The transformation into zeolites, by more or less expensive operating cycles, of particular compounds having a defined crystalline structure and chemical composition, as for instance clays, etc., by suitable treatments.

We have now found a very simple and cheap process for preparing synthetic zeolites. Said process is essentially based on the fact that the starting material has not a crystalline structure, namely is amorphous or essentially amorphous and, after suitable grinding, is subjected to an alkali treatment, at a temperature higher than the room temperature. Owing to this treatment synthetic zeolites are formed.

Suitable starting materials of amorphous type are the natural glasses, as for instance the ones of rhyolitic type (a non-limitative example of the starting materials according to the invention consists of the Dipari pumices), or synthetic glasses prepared in laboratory by melting a suitable mixture of natural oxides or silico aluminates suitably modified.

The contact solution consists of an alkaline solution, preferably a NaOH solution of suitable concentration. The alkaline solution concentration is one of the elements determining the type of the zeolite obtainable as product. Other elements determining the zeolite structure are: the working temperatures, the contact time, and the ratios between the solid starting material and the alkaline solution, said factors being mutually linked up.

The temperatures may range for instance from 50° to 150° C.; the contact times range from some minutes up to 60 hours, generally those between 1 hour and 30 hours being sufficient; finally the ratios between the solid amorphous starting material and the contact solution are selected in such a way that the amount of said solid starting material varies from 0.1 to 10% by weight of the contact solution and preferably from 4 to 6%.

The process according to the invention consists therefore in selecting an amorphous starting material showing a chemical structure adapted to evolve, in an alkaline medium, into the desired zeolite, in grinding it up to a suitable granulometry, particularly between 270 and 325 mesh, and in treating it with an alkaline solution in the aforesaid conditions.

A precipitate will form; the drawing of samples will then permit one to determine when a quite defined type of zeolite is prevalently present.

By the process of the invention it is possible to arrange for a synthetic quite defined zeolite to represent over 90% of the obtained precipitate.

An interesting variant of the process according to the invention is that the chemical composition of the natural starting material can be easily "corrected" so as to obtain a glass ready to evolve into the zeolite to be produced.

Indeed the composition of any starting natural silico aluminate may be integrated with an absent element, by adding a compound of said element to the melted material or by the possible scorification of the whole or a portion of another compound to be removed (by the methods known in the art).

The advantages offered by the invention in the synthetic zeolites production field, and, as a consequence, in the wider oil products field, are clear to the technician. A high simplicity of the process performed by elementary operations and what's more in very mild working conditions; the versatility owing to the possibility of modifying always very simply the starting compositions of the natural or synthetic products and the consequent possibility of obtaining a wide range of synthetic zeolites are a real technical advance, mainly for industrial applications, in the specific field of the zeolites production. To better illustrate the invention, two examples are given only by way of illustration.

EXAMPLE 1

The process of the invention as above described was employed in the manufacture of a synthetic zeolite of the type known as "faujasite." A natural glass, of rhyolitic type such as Lipari pumice, having the following chemical composition:

| | Percent |
|---|---|
| $SiO_2$ | 70.85 |
| $TiO_2$ | 0.15 |
| $CaO$ | 0.83 |
| $K_2O$ | 4.70 |
| $Al_2O_3$ | 12.83 |
| $Fe_2O_3$ | 1.02 |
| $MgO$ | 0.55 |
| $H_2O^-$ | 0.70 |
| $MnO$ | 0.11 |
| $FeO$ | 1.35 |
| $Na_2O$ | 4.46 |
| $H_2O^+$ | 3.01 |
| Total | 100.56 | was pulverized up to a granulometry corresponding to a powder passing through the 270 mesh sieve. This powder was then treated with an alkaline solution of 2.5 N concentration. The solid/liquid ratio was 1:25.

The contact was carried out at a temperature of 80° C. A precipitate was obtained, which was analyzed from time to time. After a few hours a synthetic zeolite was obtained. It proved to consist of sodium-phillipsite Na—Pc) zeolite and "faujasite" showing the following diffraction diagram (limited to the main reflections, the lines not connected with the "faujasite" having been removed).

| I/I Max.: | $d$, A. |
|---|---|
| 100 | 14, 32 |
| 24 | 8, 81 |
| 16 | 7, 51 |
| 32 | 5, 71 |
| 16 | 4, 41 |
| 36 | 3, 80 |
| 10 | 3, 77 |
| 34 | 3, 33 |
| 12 | 2, 93 |
| 36 | 2, 87 |
| 14 | 2, 78 |
| 12 | 2, 65 |

The test above reported was repeated with different NaOH concentrations variable in the range from 2 N to 3 N, and a great deal of "faujasite" was always obtained.

Another series of tests performed by varying the alkaline solution concentration, namely employing solutions from 3 N to 5 N, showed that mixtures of zeolites could be obtained comprising: faujasite, zeolite A, zeolite E, sodium phillipsite (Na—Pc) and hydroxysodalite.

EXAMPLE 2

The process of the invention above described was employed also in the manufacture of a synthetic zeolite of the "faujasite" type, starting from synthetic glass.

The glass, ground up to 270 mesh, had the following composiiton: $3Na_2O.Al_2O_3.4SiO_2$.

The employed conditions were:

| | | |
|---|---|---|
| Temperature | °C | 80 |
| Contact solution NaOH | percent | 4–6 |
| Solid/liquid ratio | | 1:20 |
| Time | hours | 12 |

The spectrum of the neoformation product obtained in the aforesaid conditions is the following:

| I/I Max.: | $d$, A. |
|---|---|
| 100 | 14, 30 |
| 26 | 8, 79 |
| 16 | 7, 52 |
| 28 | 5, 70 |
| 7 | 4, 78 |
| 18 | 4, 40 |
| 6 | 3, 94 |
| 34 | 3, 79 |
| 12 | 3, 76 |
| 38 | 3, 34 |
| 10 | 2, 93 |
| 35 | 2, 86 |
| 14 | 2, 78 |
| 15 | 2, 66 |

It is also possible to obtain the synthesis of faujasite from the aforesaid glass under different treatment conditions, for instance raising the temperature over 100° C. However, in this last case the faujasite always forms together with zeolite Na—Pc.

What we claim is:

1. The process of preparing synthetic zeolite by treating a silicon-aluminum compound with alkali, characterized in that said silicon-aluminum compound is a pulverized, amorphous Lipari pumice showing granulometries between 270 and 325 mesh, wherein the treatment is carried out with a 2 N–3 N sodium hydroxide contact solution at a temperature of 80° C., the Lipari pumice/contact solution ratio is 1:25 by weight, and synthetic zeolite consisting of over 90% faujasite is collected as a precipitate.

References Cited

UNITED STATES PATENTS

| | | | |
|---|---|---|---|
| 3,535,075 | 10/1970 | Ueda et al. | 23—112 |
| 1,116,038 | 11/1914 | Duggan | 23—111 |
| 3,101,251 | 8/1963 | Howell | 23—113 |
| 3,411,874 | 11/1968 | Ciric | 23—113 |
| 3,431,218 | 3/1969 | Plank et al. | 252—455 |
| 3,436,174 | 4/1969 | Sand | 23—113 |
| 3,532,459 | 10/1970 | McEvoy et al. | 23—112 |

FOREIGN PATENTS

| | | | |
|---|---|---|---|
| 1,487,452 | 5/1967 | France | 252—455 |

EDWARD J. MEROS, Primary Examiner

U.S. Cl. X.R.

423—329